United States Patent [19]

Orii et al.

[11] Patent Number: 5,063,339

[45] Date of Patent: Nov. 5, 1991

[54] STEPPING MOTOR DRIVING DEVICE

[75] Inventors: Akira Orii; Haruhisa Watanabe, both of Tokyo, Japan

[73] Assignee: Janome Sewing Machine Co. Ltd., Tokyo, Japan

[21] Appl. No.: 126,226

[22] Filed: Nov. 25, 1987

[30] Foreign Application Priority Data

Dec. 1, 1986 [JP] Japan .................. 61-284257

[51] Int. Cl.⁵ .............................................. H02P 8/00
[52] U.S. Cl. ..................................... 318/696; 318/685
[58] Field of Search ................................ 318/696, 685

[56] References Cited

U.S. PATENT DOCUMENTS

| | | | |
|---|---|---|---|
| 3,486,096 | 12/1969 | Van Cleave | 307/268 |
| 4,336,484 | 6/1982 | Marinko | 318/696 |
| 4,358,725 | 11/1982 | Brendemuehl | 318/696 |
| 4,412,166 | 10/1983 | Crider et al. | 318/696 |
| 4,638,235 | 1/1987 | Ogura | 318/696 |
| 4,692,679 | 9/1987 | Hujita | 318/696 |

Primary Examiner—William M. Shoop, Jr.
Assistant Examiner—Saul M. Bergmann
Attorney, Agent, or Firm—Michael J. Striker

[57] ABSTRACT

In a four-phase stepping motor driving apparatus phase-A and phase-$\overline{A}$, or phase-B and phase- are prevented from simultaneously becoming conductive. A device for this includes a change-over circuit which validates either of the phase-A and the phase-$\overline{A}$, a change-over circuit which validates either of the phase-B and the phase-$\overline{B}$, a change-over circuit which renders both the phase-A and the phase-$\overline{A}$ conductive or nonconductive and a change-over circuit which rendered both the phase-B and the phase-$\overline{B}$ conductive or nonconductive.

4 Claims, 5 Drawing Sheets

FIG_1
PRIOR ART
ON/OFF circuit for phase-A (or -B)
ON/OFF circuit for phase-Ā (or -B̄)
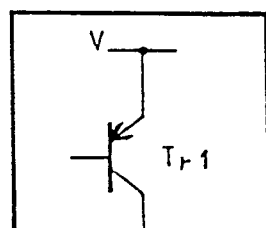
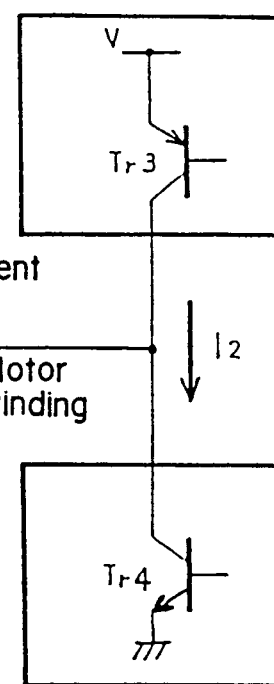
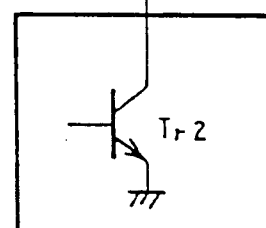
ON/OFF circuit for phase-Ā (or -B̄)
ON/OFF circuit for phase-A (or -B)

FIG_2
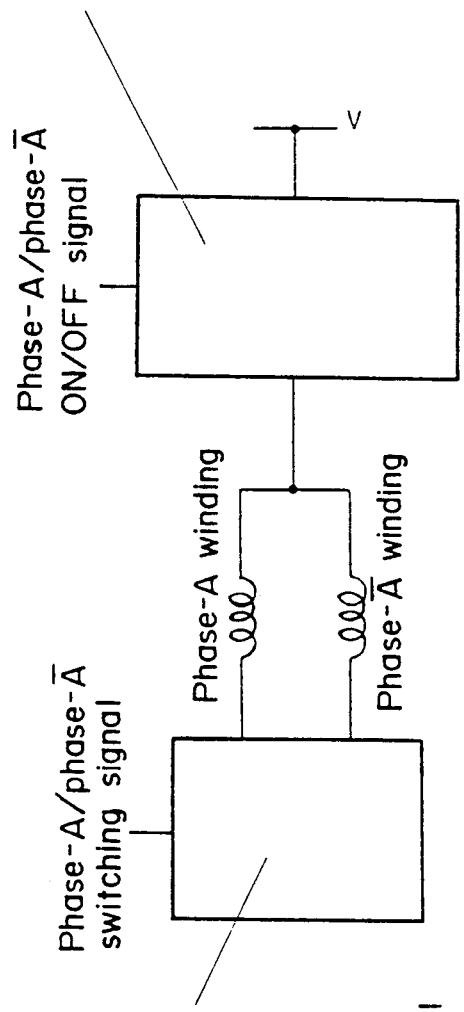
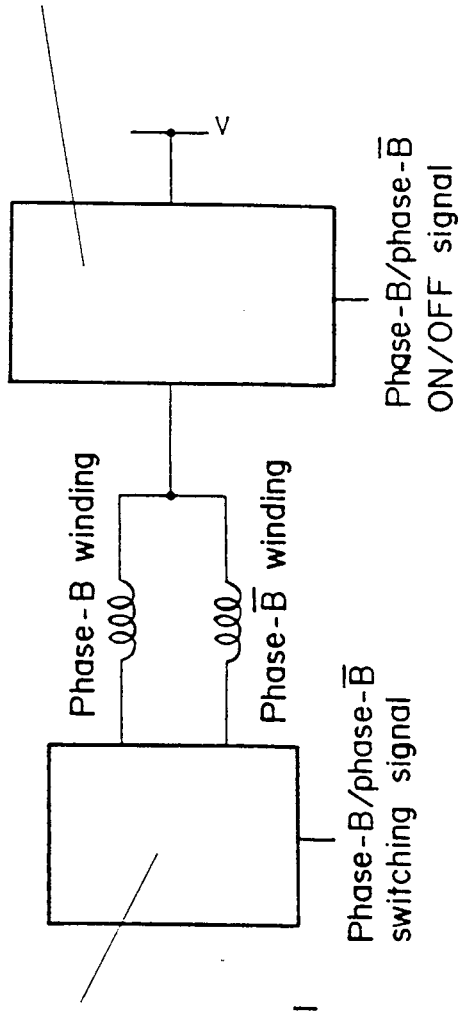

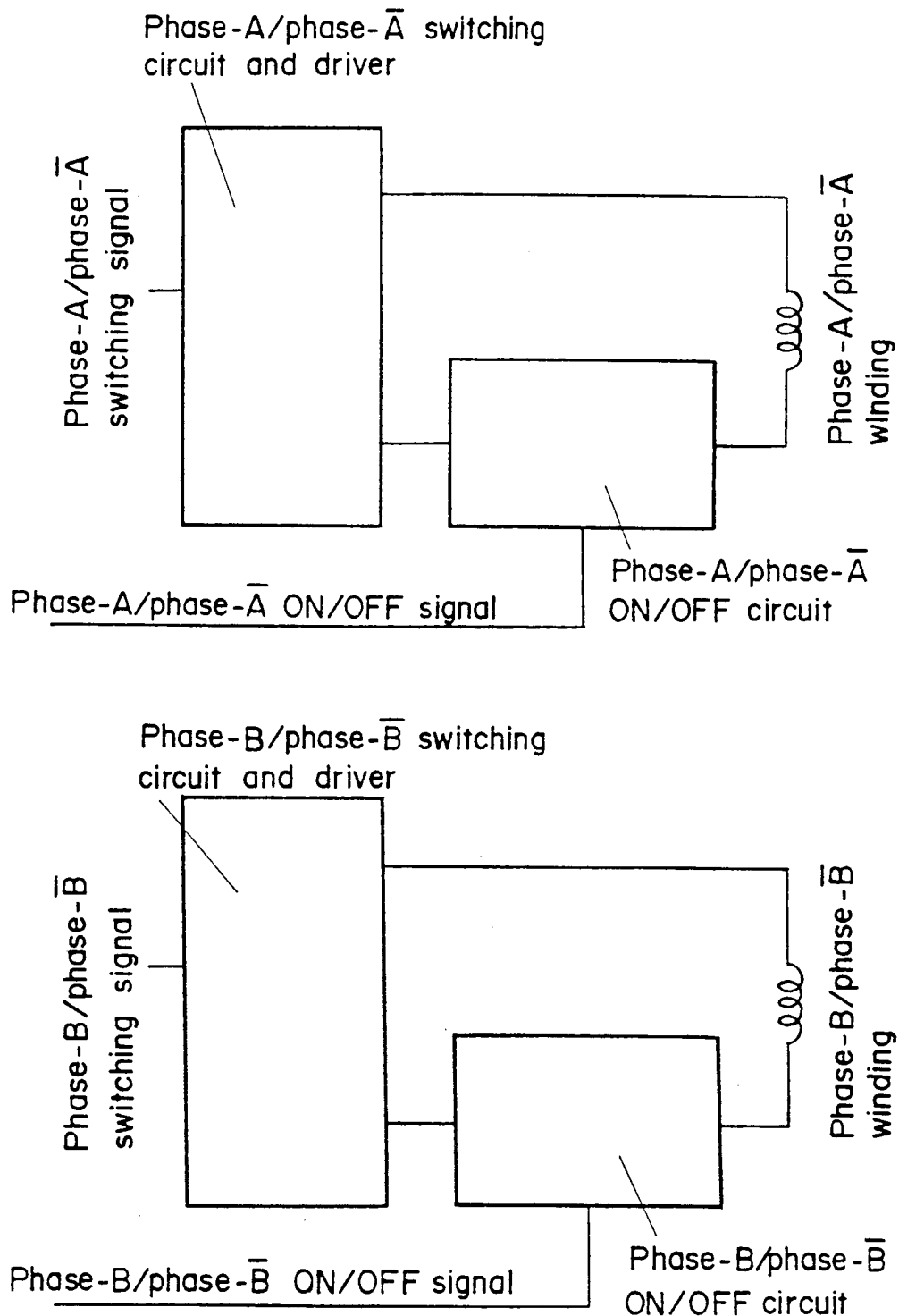
FIG_3

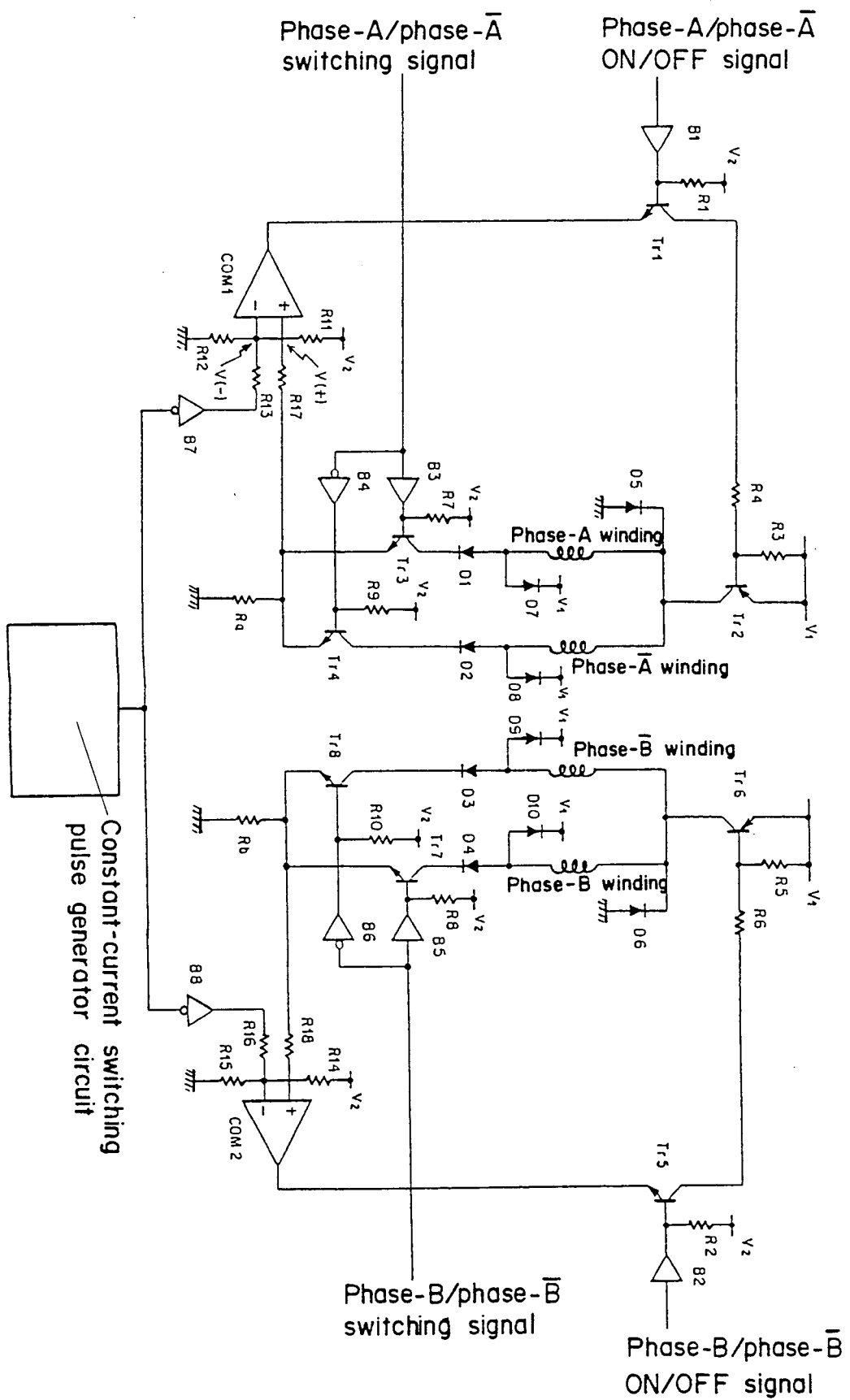
FIG_4

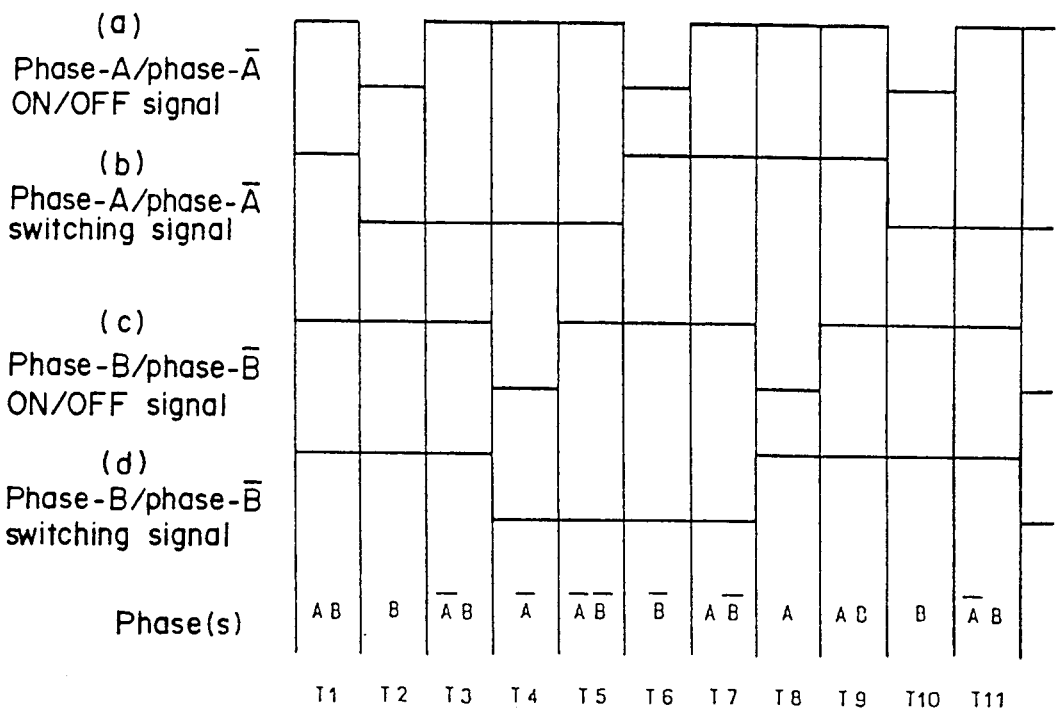
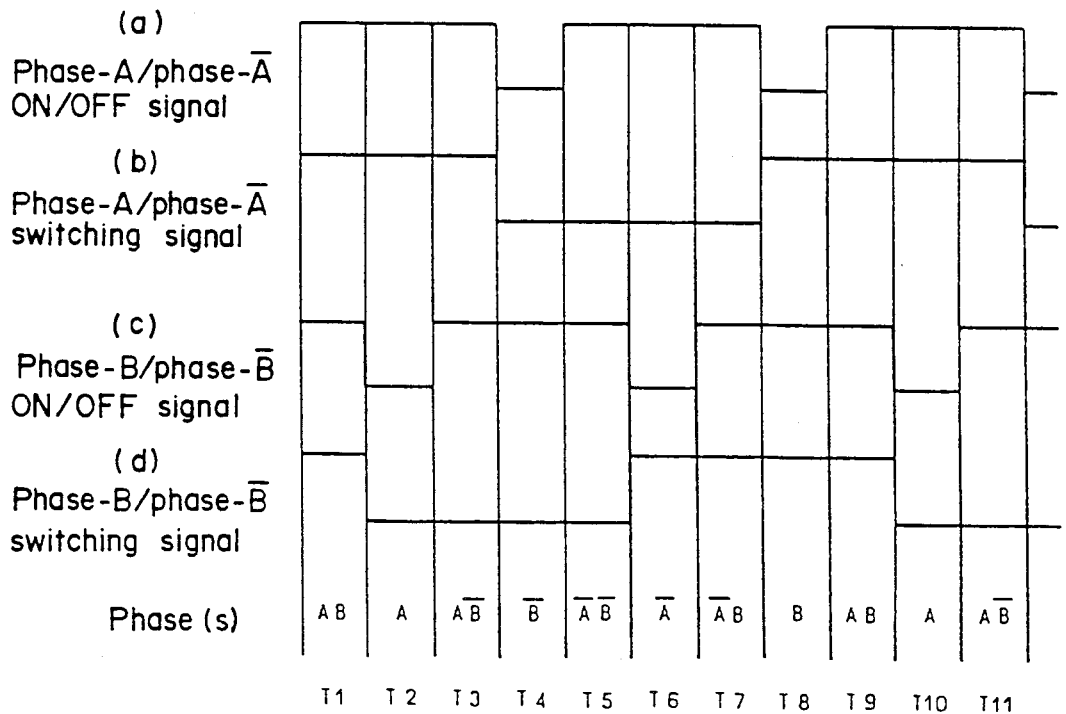

5,063,339

1

STEPPING MOTOR DRIVING DEVICE

FIELD OF THE INVENTION

The present invention relates to a driving device for a four-phase stepping motor which prevents a motor driver from breaking down or deteriorating even in case of any malfunction in a circuit for generating an energization pattern for the four-phase stepping motor (called as "motor" hereinafter) having a A, $\overline{A}$, B and $\overline{B}$ phases or energization waves.

BACKGROUND OF THE INVENTION

A motor driving device in the prior art has been of a scheme wherein all of four phases are respectively controlled by change-over circuits (each called as "ON/-OFF circuit" hereinafter) for switching current, and wherein energization pattern controlled signals are applied to the ON/OFF circuits from an energization pattern signal generating circuit (called as "pattern generator circuit" hereinafter) so as to drive a motor.

Since the ON/OFF circuits of the respective phases are independent, the energization current simultaneously flow in the motor winding for the phases-A and -$\overline{A}$ or for the phases-B and -$\overline{B}$, when a malfunction occurs in the pattern generator circuit.

In a motor of unipolar drive, the motor winding for the phases-A and -$\overline{A}$ or for the phases-B and -$\overline{B}$ are respectively wound on an identical core in opposite directions to each other. Therefore when the currents simultaneously flow in the respective motor winding of phases-A and -$\overline{A}$ or the phases-B and -$\overline{B}$, the inductance of the windings decreases consequently overcurrents flow through the drive circuit and the motor to deteriorate them or to break them down.

SUMMARY OF THE INVENTION

The present invention has been made in view of the problems involved with the prior art, and its objective is to prevent reliably and inexpensively the breadown and deterioration of a drive circuit and the motor due to any malfunction of the pattern generator circuit.

The motor driving apparatus of this invention is so constructed that energization current waves or phases-A and -$\overline{A}$ or phases-B and -$\overline{B}$ are operated with logic levels opposite each other and are supplied to the motor windings by control lines each of which corresponds to an assigned phase.

Thus, when the pattern generator circuit has caused a malfunction, the phases-A and -$\overline{A}$ or the phases-B and -$\overline{B}$ do not turn on simultaneously, and the breakdown and deterioration of the driver and the motor do not occur.

BRIEF DESCRIPTION OF THE DRAWINGS

FIG. 1 is a block diagram of a prior art bipolar motor drive circuit;

FIG. 2 is a block circuit diagram of a unipolar motor driving device according to the invention;

FIG. 3 is a block circuit diagram of a bipolar motor driving device according to the invention;

FIG. 4 is a schematic circuit diagram of a part of the unipolar motor drive circuit of FIG. 2.

FIG. 5 shows a timing diagram for a 1-phase - 2-phase energization pattern of forward rotation in the circuit of FIG. 4; and FIG. 6 shows a timing diagram for a 1-phase - 2-phase energization pattern of reverse rotation in the circuit of FIG. 4.

DESCRIPTION OF THE PREFERRED EMBODIMENTS

FIG. 1 shows schematically a block diagram of a prior art bipolar stepping motor drive device in which each of the four phases A, $\overline{A}$, B and $\overline{B}$ is made effective or ineffective by respective switch circuits $Tr_1$ to $Tr_4$. The four phases are controlled by the four switch circuits independently of each other. Therefore, if a non-illustrated circuit for generating an enegization pattern signal has some trouble, it is probable that the ON/OFF switch circuits or transistors $Tr_1$ and $Tr_2$ for the phases -A and -$\overline{A}$, or the switch circuits or transistors $Tr_3$ and $Tr_4$ for the phases -B and -$\overline{B}$ turn ON simultaneously, giving rise to excessive currents $I_1$ or $I_2$ which in turn may cause deterioration or the breakdown of the drive device. The pattern signal generating circuit can be for example in the form of a microprocessor.

FIG. 2 shows a block circuit diagram for a unipolar stepping motor drive device of the invention. The motor has a pair of A- and $\overline{A}$-phase windings and another pair of B- and $\overline{B}$-phase windings, each pair being wound around a common core, one being wound in one direction and the other being wound in the opposite direction. The drive device includes an ON/OFF circuit and a switching circuit provided for each of the two pairs of the phase -A and -$\overline{A}$ and the phase -B and -$\overline{B}$ windings. Each ON/OFF circuit is responsive to the ON or OFF signal generated by a non-illustrated energization pattern signal generating circuit, to connect (or disconnect) a power source V to (or from) a common terminal or connection point of one of the two pairs of phase windings (phase A, $\overline{A}$ or phase B, $\overline{B}$). Each of the switching circuits is responsive to a switching signal generated by the energization pattern signal generating circuit to select one of the phase windings in each pair (i.e. phase A or $\overline{A}$ and phase B or $\overline{B}$ windings) to be energized. The switching circuits are thus phase selecting circuits.

FIG. 3 shows a block circuit diagram for a bipolar stepping motor drive device of the invention. The motor has a first winding for A and $\overline{A}$ phases and a second winding for B and $\overline{B}$ phases. The operation principle is the same as that of the unipolar type drive device as shown in FIG. 2. The only difference is in that the drive device passes the energization current in one or the opposite direction through the first or the second winding.

DETAILED CIRCUIT DESCRIPTION OF THE INVENTION

FIG. 2 and FIG. 3 show block arrangement examples applied to a unipolar motor driving circuit and a bipolar motor driving circuit, respectively.

FIG. 4 shows a detailed circuit arrangement example applied to phase -A and -$\overline{A}$ winding of the unipolar motor driving circuit, of FIG. 2. FIG. 5 and FIG. 6 show timing charts of various signals to be applied to the circuit shown in FIG. 4.

Circuit operations in FIG. 4 will be described with reference to the timing chart of FIG. 5. A buffer or gate $B_1$ (in FIG. 4) has an input connected to an energization pattern signal generating circuit (not shown) and has an output connected to the base of NPN transistor $Tr_1$. A pull-up resistor $R_1$ is connected between a power source $V_2$ and a point between the buffer $B_1$ and the transistor $Tr_1$.

The transistor $Tr_1$ has a collector connected to the base of PNP transistor $Tr_2$ through a resistor $R_4$ for limiting the current to the transistor $Tr_2$. A resistor $R_3$ is connected between a power source $V_1$ and a point between the resistor $R_4$ and the transistor $Tr_2$ to stabilize the base voltage of the transistor $Tr_2$. The transistor $Tr_1$ has an emitter connected to an output of a comparator $COM_1$.

The buffer $B_3$ has an input connected to the energization pattern signal generating circuit and has an output connected to the base of NPN transistor $Tr_3$. A resistor $R_7$ is connected between a power source $V_2$ and a point between the buffer $B_3$ and the transistor $Tr_3$ to stabilize the base voltage of the transistor $Tr_3$.

An inverter $B_4$ has an input connected to a point between the buffer $B_3$ and the energization pattern signal generating circuit and has an output connected to the base of the transistor $Tr_4$. A resistor $R_9$ is connected between a power source $V_2$ and a point between the inverter B and the transistor $Tr_4$ to stabilize the base voltage of the transistor $Tr_4$.

The transistor $Tr_2$ has an emitter connected to the power source $V_1$ and has a collector connected to one end of A and $\overline{A}$ phase windings respectively and to the cathode of a free wheel diode $D_5$. The A- phase winding has the other end connected to the collector of the transistor $Tr_3$ through a diode $D_1$ which is provided to prevent the current from reversely flowing. Free wheel diode $D_7$ has a cathode connected to a power source $V_1$ and has an anode connected to a point between the A-phase winding and the diode $D_1$.

The $\overline{A}$-phase winding has the other end connected to the collector of the transistor $Tr_4$ through a diode $D_2$ which is provided to prevent the current from reversely flowing. Free wheel diode $D_8$ has a cathode connected to a power source $V_1$ and has an anode connected to a point between the $\overline{A}$-phase winding and the diode $D_2$.

The transistors $Tr_3$ and $Tr_4$ have emitters respectively connected to the (+) input of the comparator $COM_1$ on a common line through a protective resistor $R_{17}$. A resistor Ra has one end connected between the emitters of the transistors $Tr_3$ and $Tr_4$ and has the other end grounded for detecting the amount of current flowing through the A- and $\overline{A}$-phase windings.

A constant current drive, for example, of 2K Hz, is connected to the (−) input of the comparator $COM_1$ through an inverter $B_7$ and a protective resistor $R_{13}$. Resistors $R_{11}$ and $R_{12}$ have each one end connected to a point between the resistors $R_{13}$ and the (−) input of comparator $COM_1$. The resistor $R_{11}$ has the other end connected to a power source $V_2$ and the resistor $R_1$ has the other end grounded. The two resistors are provided to form a reference value of the comparator $COM_1$.

The operation is as follows. If the energization pattern signal generating circuit produces a high level signal, the transistor $Tr_1$ is turned on through the buffer $B_1$ and accordingly the transistor $Tr_2$ is turned on to allow the current from the power source $V_1$ to the circuit of the A- and $\overline{A}$-phase windings. On the other hand, with respect to the transistor $Tr_3$ and $Tr_4$, if the energization pattern signal generating circuit produces a high level signal, the transistor $Tr_3$ is turned on through the buffer $B_3$ while the transistor $Tr_4$ is turned off through the inverter $B_4$, and the current flows through the A-phase winding.

If the energization pattern signal generating circuit produces a low level signal, the transistor $Tr_3$ is turned off while the transistor $Tr_4$ is turned on through the inverter $B_4$ and accordingly the current flow through the $\overline{A}$-phase winding.

In this case, if the current flows through the A-or $\overline{A}$-phase winding, a voltage is applied to the voltage detecting resistor or Ra. If the voltage is above the set or reference voltage at the comparator $COM_1$, the comparator is operated to block the current flowing from the transistor $Tr_1$ and turns off the transistor $Tr_1$ and accordingly the transistor $Tr_2$ is turned off until the detected voltage becomes equal to or below the set or reference voltage of the comparator $COM_1$. If the detected voltage becomes equal to or below the reference voltage of the comparator $COM_1$, the comparator is otherwise operated to turn the transistor $Tr_1$ on again, and accordingly the transistor $Tr_2$ is turned on to allow the current to the phase coil. Thus, the stepping motor is driven at a constant value of current.

The free wheel diodes $D_5$, $D_7$ and $D_8$ are provided to prevent the transistors $Tr_3$ and $Tr_4$ from suffering possible damages which may be caused by the electromotive force produced at the A- or $\overline{A}$-phase winding when the related transistor is turned off. Such electromotive force is reduced by the free wheel diode to the power source voltage value.

The counterpart drive circuit for the B- and $\overline{B}$-phase windings is composed of the same elements and is of the same operation as the above mentioned drive circuit for the A- and $\overline{A}$-phase windings.

From the above description it is apparent that the circuit of the invention is so structured as to securely prevent the A- and $\overline{A}$-phase windings or the B- and $\overline{B}$-phase windings from being simultaneously energized.

With the description as set forth above, it may be understood that the ON/OFF circuit for passing or stopping the current to the circuit, for example, of A- and $\overline{A}$-phase windings is composed of the buffer or gate $B_1$, transistor $Tr_1$ and $Tr_2$. On the other hand, the switching circuit for designating one of the coils to be energized or deenergized is composed of buffer $B_3$, inverter $B_4$, and transistors $Tr_3$ and $Tr_4$.

At a time $T_1$, since a signal (a) is at a high level H, a transistor $Tr_1$ turns ON. If the output of a comparator $COM_1$ is at a low level L, a transistor $Tr_2$ also turns ON. Since a signal (b) is at H, a transistor $Tr_3$ turns ON. Therefore, current flows in phase-A.

When the current flows in the phase-A, a voltage drop across a resistor Ra increases. When a voltage $V(+)$ has become greater than a voltage $V(-)$, the output of the comparator $COM_1$ becomes H, and the transistor $Tr_2$ turns OFF. Thereafter, the transistor $Tr_2$ repeats ON and OFF in accordance with the output frequency of a constant-current switching pulse generator circuit, and a constant-current operation is performed.

Besides, at the time $T_1$, since signals (c) and (d) are also at the high level H, a phase-B similarly turns ON to establish a constant-current operation. Accordingly, the phases-A and -B are rendered conductive.

At a time $T_2$, the signal (b) is L, and a transistor $Tr_4$ turns ON. Since, however, the signal (a) is L, the transistors $Tr_1$ and $Tr_2$ are OFF, and current flows in neither of phases-A and -$\overline{A}$.

Since the signals (c) and (d) are H, the constant-current operation continues as at the time $T_1$. Therefore, the phase-B is rendered conductive.

At a time $T_3$, since the signal (a) becomes H, the phase -A turns ON. The signals (c) and (d) turn the phase-B ON as at the time $T_2$. Accordingly, the phase-A and -B are rendered conductive.

At $T_4$, (a) is H, (b) is L, and (c) is L, so that the phase-$\overline{A}$ is rendered conductive.

At $T_5$, (a) is H, (b) is L, (c) is H and (d) is L, so that phases-$\overline{A}$ and -$\overline{B}$ are rendered conductive.

At $T_6$, (a) is L, (c) is H and (d) is L, so that the phase-$\overline{B}$ is rendered conductive.

At $T_7$, (a) is H, (b) is H, (c) is H, and (d) is L, so that the phases-A and -$\overline{B}$ are rendered conductive.

At $T_8$, (a) is H, (b) is H and (c) is L, so that the phase-A is rendered conductive.

Thenceforth, similar operations are performed at $T_9$, $T_{10}$ . . . .

In case of conforming to the timing chart in FIG. 6, operations similarly proceed as the phases-A and -B, the phase-A, the phases-A and -$\overline{B}$, . . . .

As described above, if the phase-A/phase-$\overline{A}$ switching signal is H, the transistor Tr$_3$ turns ON and the transistor Tr$_4$ turns OFF, and if the signal is L, the transistor Tr$_3$ turns OFF and the transistor Tr$_4$ turns ON.

Accordingly, the phases-A and -$\overline{A}$ do not turn ON simultaneously.

Likewise, the phases-B and -$\overline{B}$ do not turn ON simultaneously.

What is claimed is:

1. A drive device for driving a 4-phase stepping motor having a plurality of phase circuits including a plurality of windings, said phase circuits being arranged in phase circuit pair A,$\overline{A}$ and phase circuit pair B,$\overline{B}$ and said phase circuits having terminals electrically connectable and disconnectable to a power source to energize an A-phase/$\overline{A}$-phase, and a B-phase/$\overline{B}$-phase of the stepping motor, in response to logic signals including a high level signal and a low level signal supplied from a logically operated pattern generator circuit; first switching means connected to said pattern generator circuit and structured, in response to input of the high level logic signal of the pattern generator circuit, to electrically connect one of the terminals of the phase circuits to the power source, and, in response to input of the low level signal of the pattern generator circuit, to electrically disconnect said one terminal of the phase circuits from said power source; and second switching means selectively structured so that in response to input of the high level signal of said pattern generator circuit one of the phase circuits is closed so as to energize a member of the group consisting of one of the A-phase and the $\overline{A}$-phase, one of the B-phase and the $\overline{B}$-phase, and both one of the A-phase and the $\overline{A}$-phase and one of the B-phase and the $\overline{B}$-phase, while maintaining the other phase circuits in the phase circuit pairs A,$\overline{A}$ and B,$\overline{B}$, which have not been energized, nonenergized, and said second switching means being structured so that, in response to input of the low level signal of the pattern generator circuit, said one phase circuit is closed so as to deenergize said one of said A-phase and said $\overline{A}$-phase, one of the B-phase and the $\overline{B}$-phase and both one of the A-phase and the $\overline{A}$-phase and one of the B-phase and the $\overline{B}$-phase, while energizing the other phase circuits in the phase circuit pairs A,$\overline{A}$ and B,$\overline{B}$ which have not been deenergized, said second switching means also including a logic circuit having at least two switching elements arranged therein logically operated in response to the high and low level signals of said pattern generator circuit to selectively switch said phase circuits between an energized state and a deenergized state, one of said two switching elements including a buffer and the other including an inverter.

2. The device as defined in claim 1, wherein said first switching means includes a first transistor which is responsive to said high level signal of said logically operated circuit to be brought into an electrically conductive state, and which is responsive to said low level signal of said logically operated circuit to resume an electrically nonconductive state, and a second transistor which is responsive to the electrically conductive state of said first transistor to electrically connect said one terminal of the respective phase circuits to said power source, said second transistor being responsive to the nonconductive state of said first transistor to electrically disconnect said one terminal of the respective phase circuits from said power source.

3. The device as defined in claim 2, wherein said first transistor is an NPN type transistor and the second transistor is a PNP type transistor.

4. The device as defined in claim 1, wherein said stepping motor is a unipolar motor having two pairs of phase windings, each pair having a common terminal connectable to the power source via said first switching means while the remaining terminals of respective phase windings in each pair being connectable to said power source via said second switching means.

* * * * *